United States Patent
Braasch et al.

(10) Patent No.: US 6,866,451 B2
(45) Date of Patent: Mar. 15, 2005

(54) DEVICE FOR DETECTING A THERMAL LINEAR DILATION ON PART OF A MACHINE

(75) Inventors: Jan Braasch, Trostberg (DE); Josef Müller, Burghausen (DE); Martin Seichter, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/398,571

(22) PCT Filed: Sep. 4, 2001

(86) PCT No.: PCT/EP01/10137

§ 371 (c)(1),
(2), (4) Date: Aug. 29, 2003

(87) PCT Pub. No.: WO02/31434

PCT Pub. Date: Apr. 18, 2002

(65) Prior Publication Data

US 2004/0028114 A1 Feb. 12, 2004

(30) Foreign Application Priority Data

Oct. 7, 2000 (DE) .......................... 100 49 718

(51) Int. Cl.[7] ............... B23C 9/00; B23Q 15/18
(52) U.S. Cl. .................. 409/238; 409/147; 409/135; 409/186; 409/193; 409/207; 408/8; 700/193; 33/702; 33/DIG. 19; 374/6; 374/55; 374/141; 374/183; 374/185
(58) Field of Search ...................... 409/186–188, 409/193–195, 207–208, 238–239, 131, 147–149; 408/8, 10–13; 700/193; 33/702, DIG. 19; 374/6, 45, 55, 141–142, 183–185

(56) References Cited

U.S. PATENT DOCUMENTS

| | | | |
|---|---|---|---|
| 3,293,909 A | * 12/1966 | Gledhill | 374/49 |
| 4,331,035 A | 5/1982 | Eisele et al. | |
| 4,428,976 A | 1/1984 | Eisele et al. | |
| 4,748,858 A | 6/1988 | Ort | |
| 4,808,048 A | * 2/1989 | Miller | 409/239 |
| 5,001,842 A | * 3/1991 | Wright et al. | 374/141 |
| 5,031,331 A | * 7/1991 | Herzog et al. | 33/702 |
| 5,833,407 A | * 11/1998 | Senda | 409/135 |
| 6,532,680 B2 | * 3/2003 | Braasch et al. | 374/141 |

FOREIGN PATENT DOCUMENTS

| | | |
|---|---|---|
| DE | 38 22 873 C1 | 10/1989 |
| DE | 196 43 383 A1 | 5/1998 |
| DE | 19820005 A1 | * 11/1999 |
| EP | 620424 A1 | * 10/1994 |
| WO | WO 99/36757 | 7/1999 |

OTHER PUBLICATIONS

K. Rajanna et al., "Strain–Sensitive Property of Vacuum Evaporated Manganese Films," Thin Solid Films, vol. 172, No. 1, May 1, 1989, pp. 45–50.

* cited by examiner

Primary Examiner—Erica Cadugan
(74) Attorney, Agent, or Firm—Brinks Hofer Gilson & Lione

(57) ABSTRACT

A device for detecting thermally caused linear expansions of a machine element, wherein the device includes a temperature sensor placed along an expansion direction. The temperature sensor includes a first metallic conductor having an electrical resistance that is proportional to an average temperature of an area to be monitored and a plurality of trimmer tracks in the form of further metallic conductors placed next to the first metallic conductor. The temperature sensor further includes electrical connections selectively interconnecting the plurality of trimmer tracks with the first metallic conductor and wherein the plurality of the trimmer tracks have an effective electrical resistance that is proportional to the average temperature of the area to be monitored.

11 Claims, 2 Drawing Sheets

DEVICE FOR DETECTING A THERMAL LINEAR DILATION ON PART OF A MACHINE

The present application is a national stage application under 35 U.S.C. 371 of a Patent Cooperation Treaty patent application, copy attached, Ser. No. PCT/EP01/10137, filed on Sep. 4, 2001, the entire contents of which are incoporated herein by reference, wherein Patent Cooperation Treaty patent application Ser. No. PCT/EP01/10137 was not published under PCT Article 21(2) in English.

Applicants claim, under 35 U.S.C. § 119, the benefit of priority of the filing date of Oct. 7, 2000 of a German patent application, copy attached, Ser. No. 100 49 718.7, filed on the aforementioned date, the entire contents of which are incorporated herein by reference.

BACKGROUND OF THE INVENTION

1. Field of the Invention

The present invention relates to a device for detecting a thermally caused linear expansion of a machine element of, for example, a machine tool.

2. Description of the Related Art

Heat is generated in the course of operating a machine tool, for example by the friction of a rotating spindle, which can lead to a thermal expansion of the heated machine element and therefore to inaccuracies of the dimensions of the processed workpiece. If the expansions are known, it is possible to achieve an improved dimensional accuracy of the workpiece by an appropriate readjustment.

DE 38 22 873 C1 describes a device for measuring and adjusting thermally caused linear expansions of machines, in particular machine tools. In the process the electrical resistance of a temperature sensor made of platinum, which is in thermal contact with an area of the machine element, is used as the measurement of the thermal linear expansion of the machine element in this area. Use is made of the fact that the change in the electrical resistance of a metallic conductor, as well as the linear expansion of a machine element, are good approximations of the linear functions of the temperature in a range of approximately 0 to 100° C. Even in case of a temperature distribution along the area of the machine element detected by the temperature sensor, the linear expansion of the machine element then is a good approximation of the linear function of the electrical resistance of the temperature sensor.

SUMMARY AND OBJECTS OF THE INVENTION

It is an object of the present invention to disclose a device for detecting the thermally caused linear expansion of a machine element, which can be produced in a cost-effective manner and can be flexibly employed.

This object is attained by a device for detecting thermally caused linear expansions of a machine element, wherein the device includes a temperature sensor placed along an expansion direction. The temperature sensor includes a first metallic conductor having an electrical resistance that is proportional to an average temperature of an area to be monitored and a plurality of trimmer tracks in the form of further metallic conductors placed next to the first metallic conductor. The temperature sensor further includes electrical connections selectively interconnecting the plurality of trimmer tracks with the first metallic conductor and wherein the plurality of the trimmer tracks have an effective electrical resistance that is proportional to the average temperature of the area to be monitored.

In accordance with the present invention, a temperature sensor for detecting the average temperature along the direction of expansion of a machine element includes a first metallic conductor arranged on the area to be monitored, as well as further metallic conductors in the form of trimmer tracks, which are also arranged on the area to be monitored and which detect the same temperature distribution as the first metallic conductor. The total resistance of the temperature sensor can be calibrated by electrical connections in such a way that it is possible, even in ease of large processing spreads in the course of the production of the temperature sensor, to calibrate it to a desired value, for example to the industry standard PT 100 (100 Ω at 0° C.).

A particularly cost-effective variation results, if the temperature sensor is constructed in accordance with customary printed circuit board technology. In this case copper tracks are provided on a printed circuit board substrate, which can be interconnected with each other by solder bridges in order to produce a required resistance value.

Further advantages, as well as details of the present invention ensue from the subsequent description of preferred embodiments with reference to the drawings. Shown are in:

DESCRIPTION OF THE PREFERRED EMBODIMENT(S) OF THE INVENTION

Figure 1:
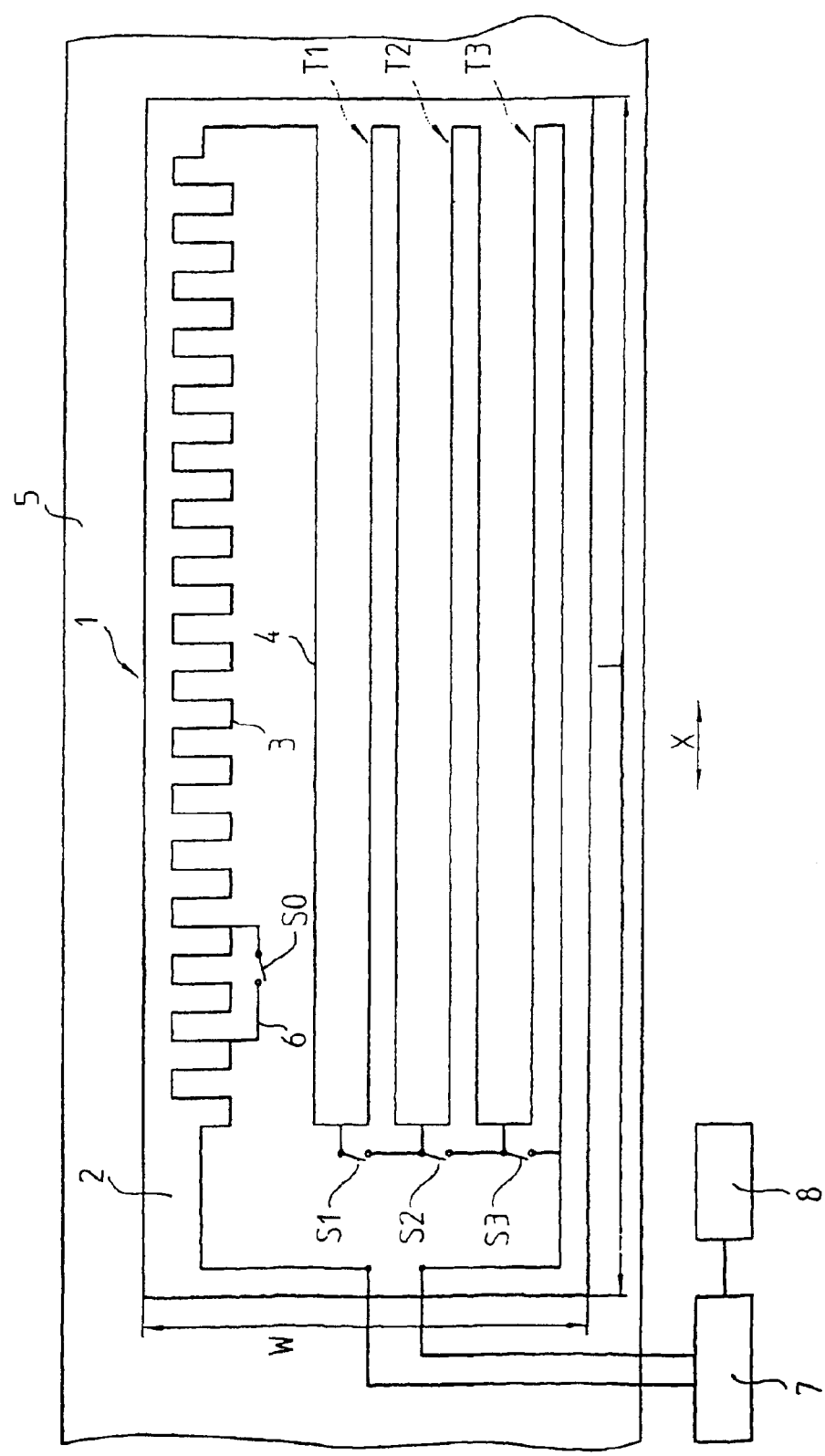
FIG. 1 shows an embodiment of a temperature sensor for detecting the temperature along a direction of expansion in accordance with the present invention.

A first simple embodiment of a device for detecting a thermally caused linear expansion is represented in FIG. 1. A temperature sensor 1 includes a printed circuit board substrate 2, which supports a first metallic conductor 3 in the form of a meander-shaped copper track with a return track 4. Let the first metallic conductor 3 have an electrical resistance R0. The trimmer tracks T1 to TN having a resistance of R1 to RN, which are also made of copper tracks and are switched in series with respect to the first metallic conductor 3, can be individually short-circuited by a solder spot via switches S1 to SN, embodied as interrupted copper tracks. In the process, the total resistance of the temperature sensor 1 is respectively reduced by the resistance R1 to RN of the short-circuited trimmer tracks T1 to TN.

In an advantageous manner the resistance value R1 to RN of the individual trimmer tracks T1 to TN doubles, so that R(N+1)=2 * RN applies. Thus, a resistance value between R0 (all trimmer tracks T1 to TN shorted out) and R0+R1+R2+ . . . +RN (all trimmer tracks T1 to TN activated) results with a temperature sensor of this type, wherein it is possible to set intermediate values of a step width of R1.

The temperature sensor 1 has a length L in the direction of its first metallic conductor 3 and its trimmer tracks T1 to TN. The width W of the temperature sensor 1, however, is comparatively narrow, a ratio L/W greater than 20 is reasonable, since it is intended to detect a temperature profile in an expansion direction X by the temperature sensor 1.

In order to arrive at a good correlation between the temperature detected by the temperature sensor 1 and the linear expansion of a machine element 5, it is important that the first metallic structure 3, as well as the trimmer tracks T1 to TN, detect the same temperature profile. If this is not the case, the resistance of the temperature sensor 1 cannot be a good measurement of the average temperature along the monitored areas of the machine element 5.

Trimmer tracks T1 to TN with low resistance over the entire length L of the temperature sensor 1 must be laid out to be very wide and require a lot of space. But in order to keep the width W of the temperature sensor 1 narrow in spite of this, an adjusting option with very low resistance can alternatively also be designed as optional bridging 6 of windings of the meander-shaped first metallic conductor 3, which are switched via electrical connections S0. In the layout of the arrangement, the resistance of the optional bridging 6 as a parallel circuit to the bridged windings of the first metallic conductor 3 must be taken into consideration. For the above mentioned reason care must be taken that no more than approximately 10% of the final resistance of the calibrated temperature sensor comes from structures which do not detect the entire temperature profile.

In a particularly advantageous embodiment, a temperature sensor 1 is realized on a conventional flexible printed circuit board substrate 2 (copper-laminated fiberglass reinforced laminate on an epoxy resin basis) of 0.3 mm thickness. In this case the thickness of the copper layer is 5 $\mu$m. The resistance of the uncalibrated temperature sensor is approximately 132 $\Omega$ with a tolerance of +/-12%. This tolerance is mainly the result of fluctuations of the thickness of the copper layer of this basic material, which can be obtained at an advantageous price. Furthermore, there are eight options for adjusting the temperature sensor 1, three of which with the resistance values 4 $\Omega$, 8 $\Omega$ and 16 $\Omega$ are embodied as trimmer tracks T1, T2, T3. The remaining five adjustment options are realized by optional bridgings 6 of various parts of the meander-shaped first metallic conductor and permit the reduction of the total resistance by 2 $\Omega$, 1 $\Omega$, 0.5 $\Omega$, 0.25 $\Omega$ and 0.125 $\Omega$. 256 combination possibilities with a graduation of 0.125$\Omega$ are achieved in this way.

The total resistance following calibration of the temperature sensor 1 should amount to 116.3 $\Omega$. The coefficient of temperature of the temperature sensor 1 (initially it corresponds to the coefficient of temperature of the copper material used) can be approximated to that of a platinum sensor by the parallel connection of an external resistor with the temperature sensor 1, and at the same time the resistance of the arrangement can be lowered to the PT 100 value of 107.8 $\Omega$ at 20° C. It is now possible to evaluate this sensor by an electronic evaluation device 7 calibrated to the PT 100 behavior, which can be advantageously obtained as a standard component.

In the least advantageous case the total resistance of this temperature sensor 1 has a portion of approximately 3.5%, which is not a function of the entire temperature profile along the length L of the temperature sensor. With this, the linear expansion of the machine element 5 can be sufficiently accurately calculated.

The resistance value of the temperature sensor 1 is measured by an electronic evaluation device 7, which calculates the linear expansion of the machine element 5 from this and passes it on to the control device 8 of the machine tool. Now, if required, the control device 8 can compensate the linear expansion by means of corrected positioning commands to the machine tool.

Regarding the embodiment of the trimmer tracks T1 to TN, it should also be noted that they can be designed not only as resistor tracks connected in series with the first metallic conductor 3 with an option for bridging by electrical connections S1 to SN, as indicated in FIG. 1, but resistor tracks are also conceivable for example, which can be subsequently connected parallel with the first metallic conductor 3 for calibration. It is possible with both variants to embody the electrical connections as described as solder bridges, however, wire bridges, 0$\Omega$-resistors, or strip conductor elements which can be severed are also conceivable.

Figure 2:
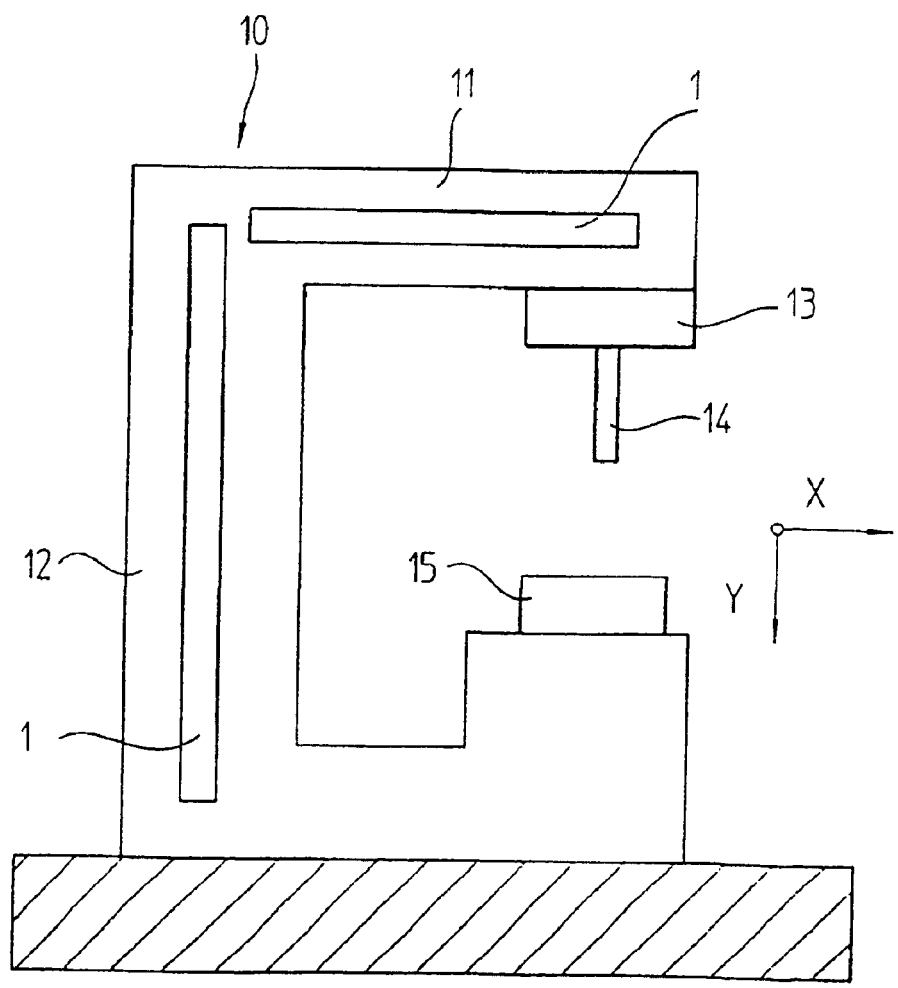
FIG. 2 shows an example of the use of the temperature sensor shown in FIG. 1 in accordance with the present invention.

A use of the described temperature sensors 1 is represented in FIG. 2. A C-type machine tool 10 has two arms 11 and 12 in the directions X and Y. Heat is generated by the rotation of a spindle 14 in a fixed bearing 13, which can spread via the arm 11 also to the arm 12. Because of this, both arms 11, 12 expand and change the distance between the spindle 14 and the workpiece 15 in an undesired manner. The temperature profile of the arms 11 and 12 is essentially detected over their entire length by the temperature sensors 1, and a correction of their linear expansion is thus possible.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A device for detecting thermally caused linear expansions of a machine element, said device comprising:
   a temperature sensor placed along an expansion direction, said temperature sensor comprising:
      a first metallic conductor having an electrical resistance that is proportional to an average temperature of an area to be monitored;
      a plurality of trimmer tracks in the form of further metallic conductors placed next to said first metallic conductor;
      electrical switch connections selectively interconnecting said plurality of trimmer tracks with said first metallic conductor for selectively adjusting an effective resistance of said plurality of trimmer tracks, and
      wherein the effective electrical resistance of said plurality of said trimmer tracks is proportional to said average temperature of said area to be monitored.

2. The device in accordance with claim 1, wherein a length of said temperature sensor along said expansion direction is at least twenty times that of a width of said temperature sensor.

3. The device in accordance with claim 1, wherein said plurality of trimmer tracks comprise stepped electrical resistances, and a total electrical resistance of said temperature sensor is adjusted with an accuracy of a lowest resistance of said plurality of trimmer tracks.

4. The device in accordance with claim 1, wherein said first metallic conductor and said plurality of trimmer tracks are embodied as strip conductors on a common printed circuit board substrate.

5. The device in accordance with claim 1, wherein said first metallic conductor and said plurality of trimmer tracks are made of copper.

6. A machine tool comprising:
   a movable tool spaced from a workpiece;
   an arm that receives heat from said movable tool and changes a distance between said movable tool and said workpiece;

a device for detecting thermally caused linear expansions of the arm, said device comprising:
  a temperature sensor placed along an expansion direction, said temperature sensor comprising:
    a first metallic conductor having an electrical resistance that is proportional to an average temperature of an area to be monitored;
    a plurality of trimmer tracks in the form of further metallic conductors placed next to said first metallic conductor;
    electrical switch connections selectively interconnecting said plurality of trimmer tracks with said first metallic conductor for selectively adjusting an effective resistance of said plurality of trimmer tracks, and
    wherein the effective electrical resistance of said plurality of said trimmer tracks is proportional to said average temperature of said area to be monitored.

7. The machine tool in accordance with claim 6, wherein said movable tool comprises a spindle.

8. The machine tool in accordance with claim 6, wherein a length of said temperature sensor along said expansion direction is at least twenty times that of a width of said temperature sensor.

9. The machine tool in accordance with claim 6, wherein said plurality of trimmer tracks comprise stepped electrical resistances, and a total electrical resistance of said temperature sensor is adjusted with an accuracy of a lowest resistance of said plurality of trimmer tracks.

10. The machine tool in accordance with claim 6, wherein said first metallic conductor and said plurality of trimmer tracks are embodied as strip conductors on a common printed circuit board substrate.

11. The machine tool in accordance with claim 6, wherein said first metallic conductor and said plurality of trimmer tracks are made of copper.

* * * * *